Patented July 14, 1942

2,289,543

UNITED STATES PATENT OFFICE 2,289,543

CYCLOHEXYL GUANIDINE AND METHOD OF PREPARING THE SAME

Ingenuin Hechenbleikner, Stamford, Conn., assignor to American Cyanamid Company, New York, N. Y., a corporation of Maine No Drawing. Application January 2, 1940, Serial No. 312,090

4 Claims. (Cl. 260—564)

The present invention relates to symmetrical dicyclohexyl guanidine.

The above compound may be prepared by the reaction between cyanogen chloride and cyclohexyl amine in an organic solvent.

Dicyclohexyl guanidine is useful as an insecticide, as a moth larvae repellent and as an intermediate.

It may be prepared as follows: 2 grams (0.035 mol) of cyanogen chloride is dissolved in 25 cc. of heptane and added to a cold solution prepared by dissolving 7.3 grams (0.065 mol) of cyclohexyl amine in 25 cc. of heptane. In about five minutes the total contents of the flask sets to a mushy solid. The mixture is then heated for six hours under reflux, whereupon the semi-solid mass in the flask is filtered and the cake dissolved in water. The water solution is then extracted with ether and treated with an excess of caustic soda. A mass of fine crystals separated which, when recrystallized from a benzene and petroleum ether mixture, was identified as symmetrical dicyclohexyl guanidine having a melting point of 182° C.

The above compound is particularly useful as an insecticide and a moth larvae repellent in that it is soluble in paint and varnish makers' naphtha. This is rather surprising in view of the fact that other guanidine compounds dissolved in this solvent only when the guanidine radical was attached to an acidic residue such as fatty acids.

Dicyclohexyl guanidine dissolved in naphtha may be readily sprayed or otherwise applied to cloth, fabric or the like so that upon evaporation of the solvent, the guanidine material remains upon the treated surface and acts as an insecticide and moth larvae repellent.

The above compound is more advantageous for such use than is, for instance, the substituted guanidine oleates in that the latter have a tendency to produce a greasy feel and appearance when used in excess.

While the invention has been described with particular reference to specific embodiments, it is not to be limited thereto but is to be construed broadly and restricted solely by the scope of the appended claims.

I claim:

1. Symmetrical dicyclohexyl guanidine.
2. A method of preparing dicyclohexyl guanidine which consists in reacting cyanogen chloride with cyclohexyl amine in an organic solvent.
3. A method of preparing dicyclohexyl guanidine which consists in reacting substantially .035 mol of cyanogen chloride dissolved in heptane with substantially .065 mol of cyclohexyl amine dissolved in heptane, heating the reaction mixture under reflux, filtering off the solids, dissolving the same in water, extracting with ether and treating the ether extract with an excess of caustic alkali, and recovering the precipitated dicyclohexyl guanidine.
4. The method of claim 3 in which the caustic alkali is caustic soda.

INGENUIN HECHENBLEIKNER.